United States Patent
Dinan

(10) Patent No.: US 9,185,613 B2
(45) Date of Patent: Nov. 10, 2015

(54) HANDOVER IN HETEROGENEOUS WIRELESS NETWORKS

(75) Inventor: Esmael Dinan, Herndon, VA (US)

(73) Assignee: Ofinno Technologies, LLC, Herndon, VA (US)

(*) Notice: Subject to any disclaimer, the term of this patent is extended or adjusted under 35 U.S.C. 154(b) by 111 days.

(21) Appl. No.: 13/607,870

(22) Filed: Sep. 10, 2012

(65) Prior Publication Data
US 2013/0064226 A1 Mar. 14, 2013

Related U.S. Application Data

(60) Provisional application No. 61/533,343, filed on Sep. 12, 2011.

(51) Int. Cl.
*H04W 4/00* (2009.01)
*H04W 36/00* (2009.01)
*H04W 36/30* (2009.01)

(52) U.S. Cl.
CPC .......... *H04W 36/0083* (2013.01); *H04W 36/30* (2013.01)

(58) Field of Classification Search
CPC . H04W 36/30; H04W 36/0072; H04W 36/06; H04W 72/0406; H04W 72/042; H04W 36/08; H04W 24/00; H04W 28/04; H04W 28/065; H04W 36/22
See application file for complete search history.

(56) References Cited

U.S. PATENT DOCUMENTS

| 6,351,642 B1* | 2/2002 | Corbett et al. ............... 455/442 |
| 2004/0224719 A1* | 11/2004 | Nounin et al. ............. 455/553.1 |
| 2006/0268756 A1* | 11/2006 | Wang et al. .................. 370/310 |
| 2007/0049276 A1* | 3/2007 | Rimoni et al. ............... 455/436 |
| 2010/0210268 A1* | 8/2010 | Lim et al. .................... 455/436 |
| 2010/0322191 A1* | 12/2010 | Lefebvre ...................... 370/331 |
| 2011/0002304 A1* | 1/2011 | Lee et al. ..................... 370/331 |
| 2011/0237269 A1* | 9/2011 | Chen ............................ 455/450 |
| 2011/0292821 A1* | 12/2011 | Chin et al. ................... 370/252 |
| 2012/0100860 A1* | 4/2012 | Lei et al. ..................... 455/438 |
| 2012/0302240 A1* | 11/2012 | Tamaki et al. ............... 455/436 |
| 2012/0307922 A1* | 12/2012 | Simonsson et al. .......... 375/260 |
| 2013/0039199 A1* | 2/2013 | Liao et al. ................... 370/252 |

OTHER PUBLICATIONS

3GPP TS 36.331 V10.0.0 (2010-12), 3rd Generation Partnership Project; Technical Specification Group Radio Access Network; Evolved Universal Terrestrial Radio Access (E-UTRA); Radio Resource Control (RRC); Protocol specification (Release 10).

* cited by examiner

*Primary Examiner* — Edan Orgad
*Assistant Examiner* — Rebecca Song
(74) *Attorney, Agent, or Firm* — Esmael Dinan; David Grossman

(57) ABSTRACT

A first base station in a network initiates handover of a wireless device in connected mode to a second base station. The first base station and the second base station have substantially different transmit powers. The first base station initiates a handover employing a first criterion, if the wireless device is in an active call from a first call category with the first base station. The first base station initiates a handover using a second criterion, if the wireless device is not in an active call from a first call category with the first base station.

19 Claims, 7 Drawing Sheets

HANDOVER IN HETEROGENEOUS WIRELESS NETWORKS

CROSS-REFERENCE TO RELATED APPLICATIONS

This application claims the benefit of U.S. Provisional Application No. 61/533,343, filed Sep. 12, 2011, entitled "Handover in Heterogeneous Wireless Networks," which is hereby incorporated by reference in its entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention enable wireless device handover in heterogeneous wireless networks. Embodiments of the technology disclosed herein may be employed in the technical field of wireless communication systems. More particularly, the embodiments of the technology disclosed herein may relate to handover in heterogeneous wireless networks.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
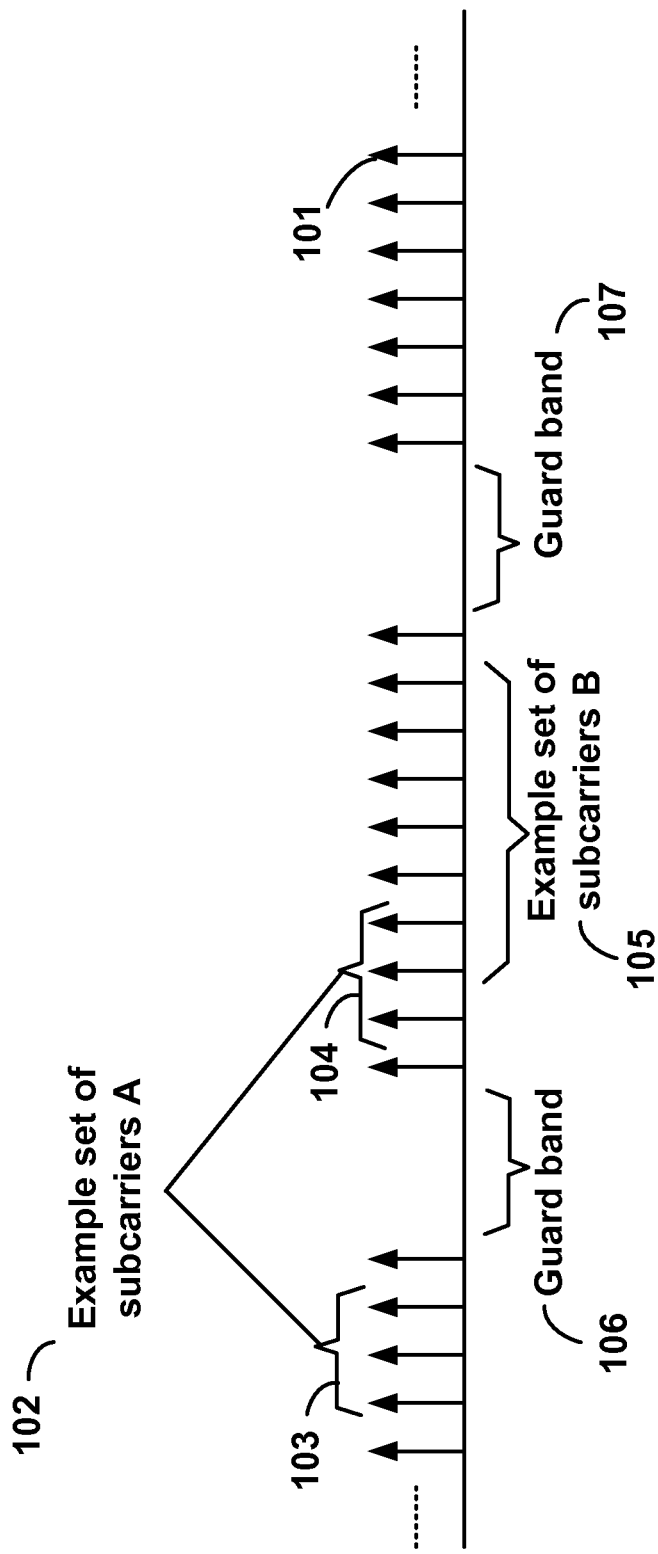
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
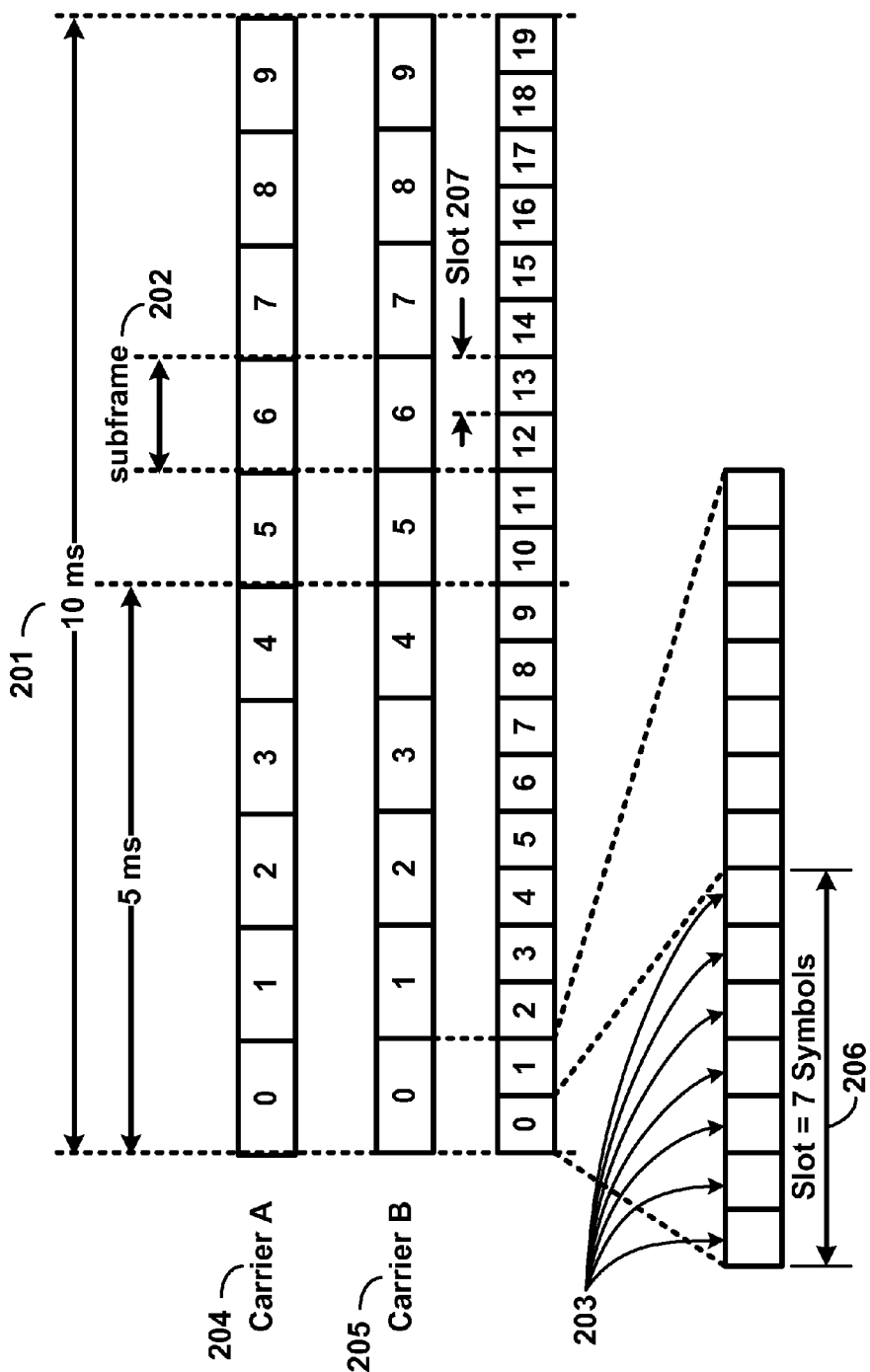
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other sub-frame durations such as including 0.5 msec, 1 msec, 2 msec, and 5 msec may also be supported. Sub-frame(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
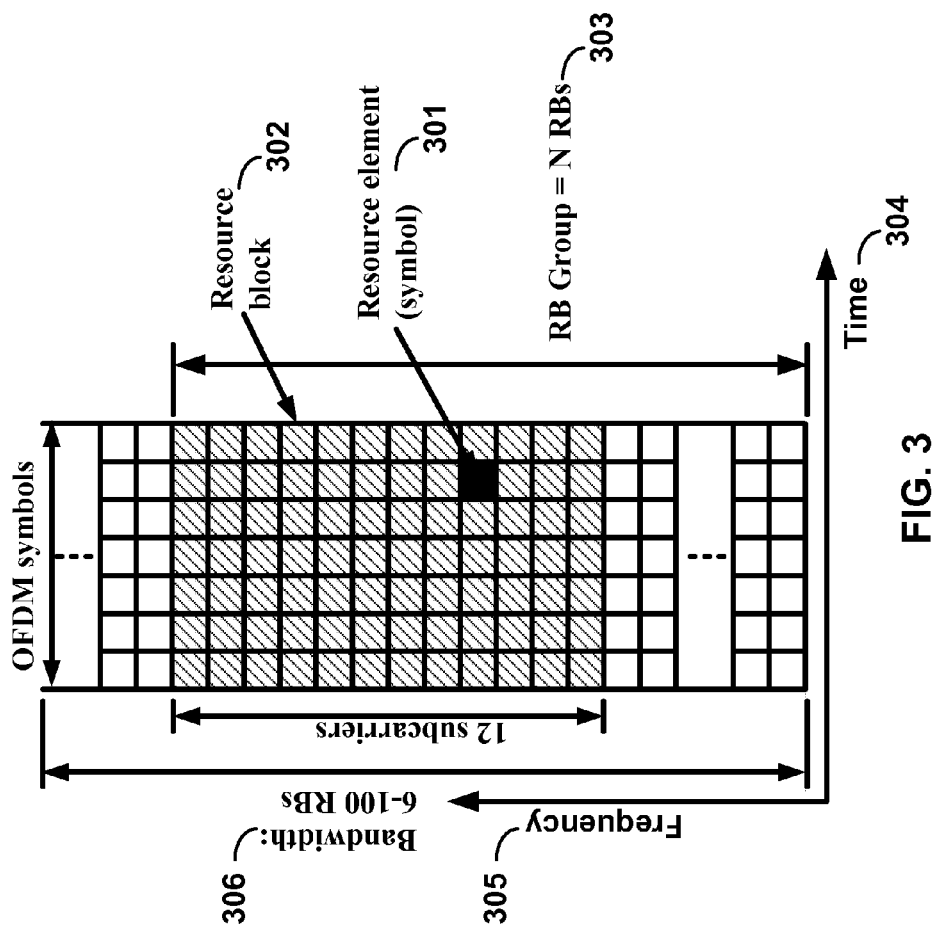
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {15, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
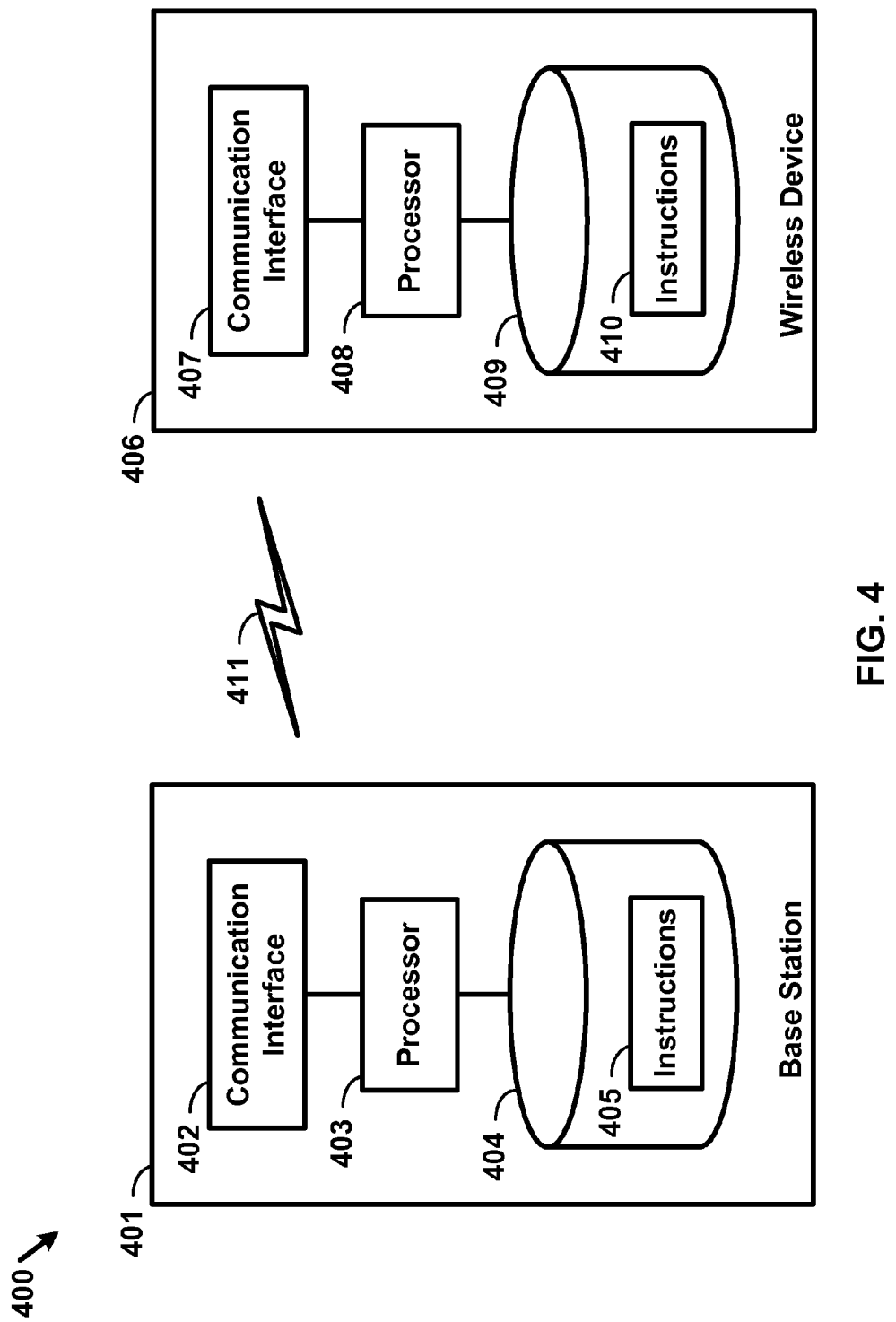
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

Figure 5:
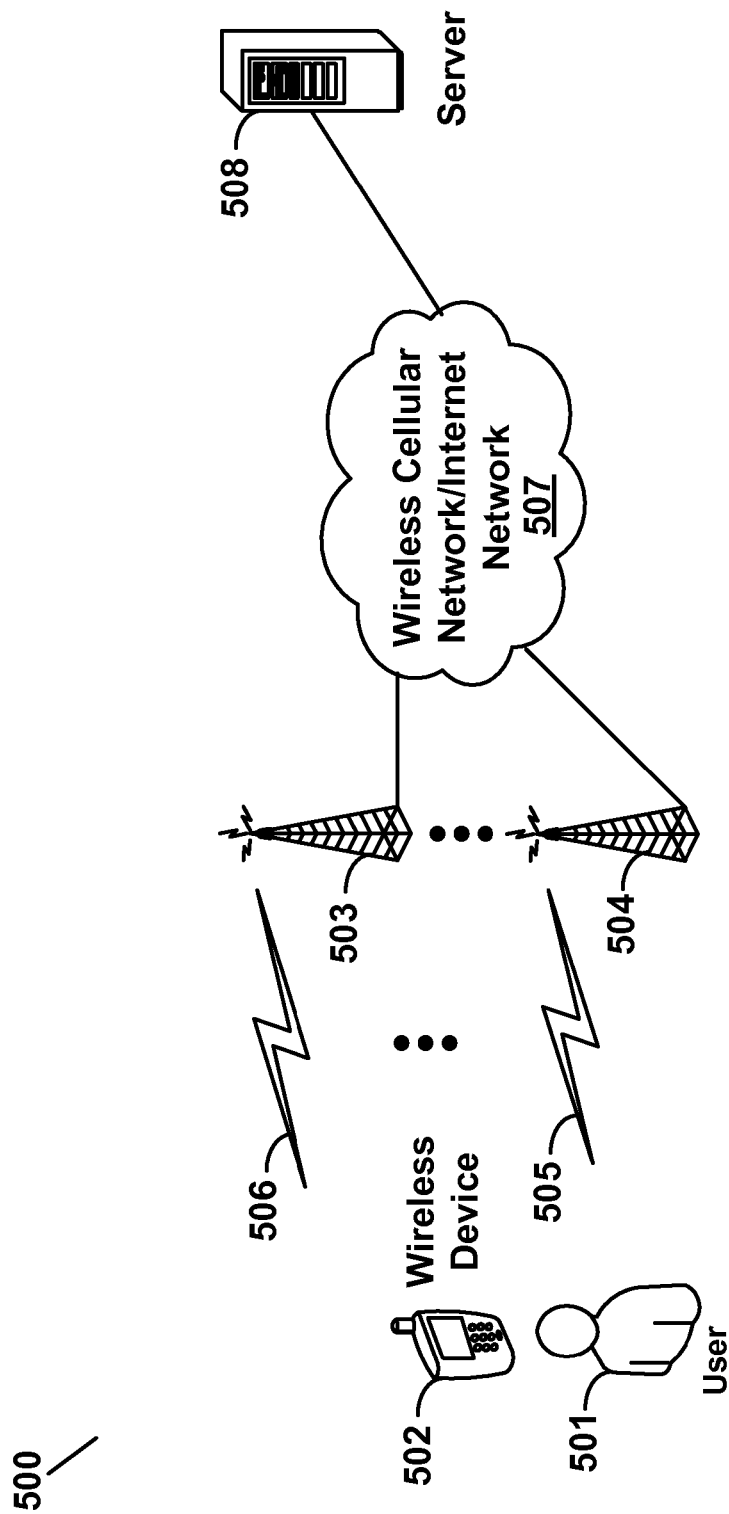
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enable wireless device handover in heterogeneous wireless networks. Other example embodiments may comprise a non-transitory tangible computer readable media comprising instructions executable by one or more processors to cause handover in heterogeneous wireless networks. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to handover in heterogeneous wireless networks. The device may include processors, memory, interfaces, and/or the like. Other example embodiments may comprise communication networks comprising devices such as base stations, wireless devices (or user equipment: UE), servers, switches, antennas, and/or the like.

Figure 6:
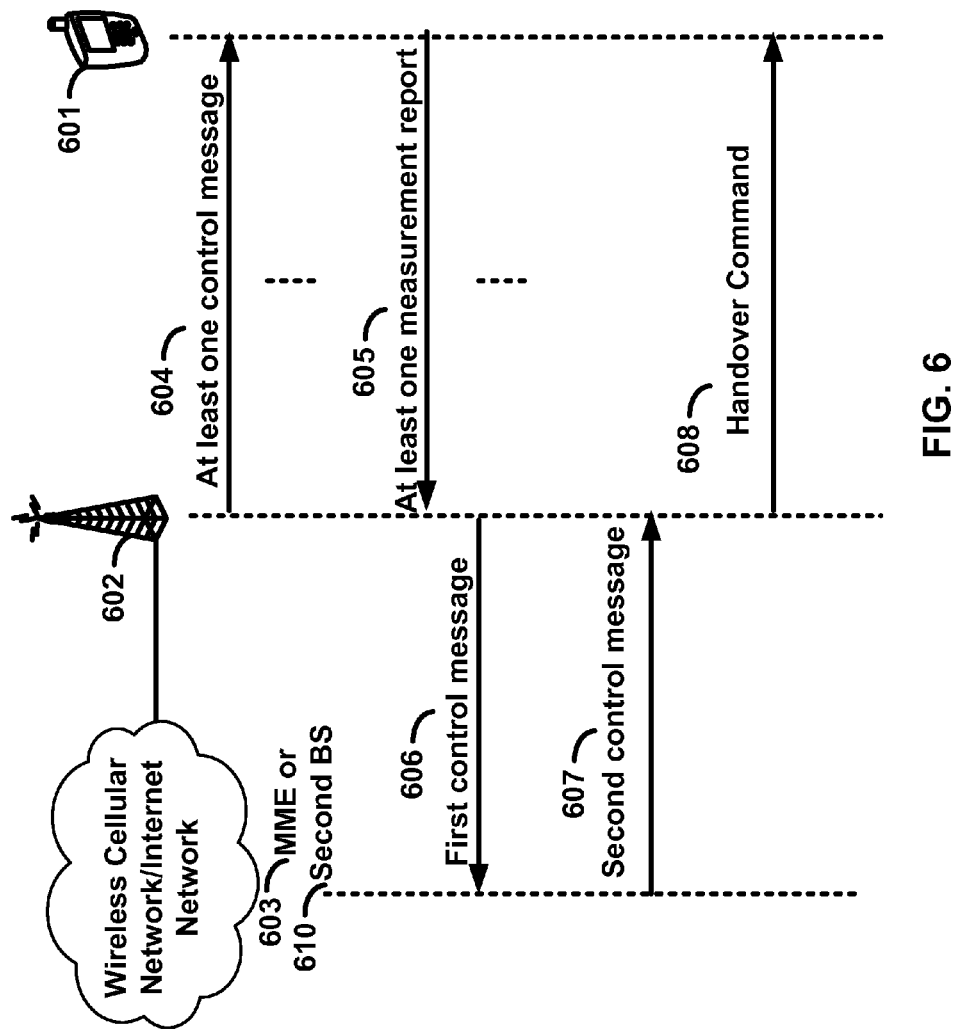
FIG. 6 depicts message flows between a base station and a wireless device as per an aspect of an embodiment of the present invention.

FIG. 6 depicts message flows between a base station and a wireless device as per an aspect of an embodiment of the present invention. According to some of the various aspects of embodiments, a first base station 602 may transmit at least one control message 604 to a wireless device 601. The first base station 602 is one of a plurality of base stations in a wireless network. The wireless device 601 may have one connection with the first base station 602. The connection may be configurable to carry a plurality of calls over the connection via a single radio technology. Each call may be from a call category in a plurality of call categories. In an example embodiment, an established radio bearer may be considered as a call. For example, an RRC connection may be established between the wireless device 601 and a base station 602. The wireless device may communicate with the base station via a first radio bearer for voice call, and a second radio bearer for a data call (such as web browsing, email, and/or the like). The at least one control message 604 may be configured to cause the configuration of measurement parameters on the wireless device. The at least one control message 604 may be configured to cause triggering measurements of signal quality of a plurality of carriers. The first base station 602 may receive at least one measurement report 605 from the wireless device 601. The at least one measurement report 605 may comprise signal quality information of a subset of the plurality of carriers.

According to some of the various aspects of embodiments, the first base station 602 may initiate the handover process by transmitting a first control message 606 to an MME 603 (via S1 interface) or by transmitting a first control message 606 to a second base station 610 (via X2 interface). In an example embodiment, the first base station 602 may transmit a first control message 606 (via S1 interface) to an MME 603 in the wireless network to initiate a handover to a second base station. In another example embodiment, the first base station 602 may transmit a first control message to the second base station 610 to initiate the handover. The first base station 602 may transmit the first control message, if at least one of the following conditions is satisfied: a first condition, a second condition, and a third condition. If one of the first, second or third condition is satisfied, the first base station 602 may initiate the handover process. The first condition may comprise: a) the first base station is a first base station type and the second base station is a second base station type; b) the signal quality information in the at least one measurement report meets a first criterion; and c) the wireless device is in an active call from a first call category employing the one connection. The second condition may comprise: a) the first base station is a first base station type and the second base station is a second base station type; b) the signal quality information in the at least one measurement report meets a second criterion; and c) the wireless device is not in an active call from the first call category employing the one connection. The third condition may comprise: a) the first base station and the second base station are the first base station type; and b) the signal quality information in the at least one measurement report meets a third criterion. The handover triggering process in example embodiments, depends on the established call category(ies) if the handover is between base stations of different types (handover in heterogeneous network). The handover criterion for handover between base stations of the first type or base stations of the second type may not depend on the call category. In example embodiments, handover for delay sensitive application may be controlled according to a different criteria in heterogeneous networks. Handover between base stations in different layers in a heterogeneous network may experience higher delay. Handover of delay sensitive communications may be controlled to reduce the possibility of handover. This may improve overall call quality.

According to some of the various aspects of embodiments, if the first control message 606 is transmitted to an MME 603, the first base station 602 may receive a second control message 607 from the MME 603. If the first control message 606 was transmitted to the second base station 610, the first base station 602 may receive a second control message 607 from the second base station 610. The second control message 607 may indicate that the second base station accepted the handover request. The first base station 602 may transmit a handover command to the wireless device 601. The handover command may initiate a handover process in the wireless device 601. The first base station type and the second base station type may have substantially different transmit powers. The first criterion may be different from the second criterion. In an example embodiment, the second criterion may be configured so that the first base station may not initiate a handover. The call may be dropped and the wireless device may establish a connection with the second base station.

A call may be carried over a radio bearer. The at least one measurement report may comprise: at least one channel state information report and/or at least one RRC measurement report. The wireless device may periodically transmit channel state information reports to the base station, when the wireless device is in RRC connected mode. The wireless device may transmit RRC measurement reports, if measurement parameters are configured by RRC connection configuration message(s). In an example embodiment, the first base station type may be a macro base station, and the second base station type may be a femto base station. In an example embodiment, the single radio technology may be LTE or LTE-Advanced Technology. The one connection may be an RRC connection. The wireless device may be configurable to maintain only one connection at a time with the first base station. The second base station may comprise at least one carrier in the subset of the plurality of carriers. The first call category may be a voice service, for example a voice service offered by a service provider. The first call category may be a delay sensitive service, for example a delay sensitive service offered by a service provider.

According to some of the various aspects of embodiments, a first base station may initiate handover of a wireless device in connected mode from the first base station to a second base station. The first base station and the second base station may have substantially different transmit powers. FIG. 6 depicts message flows between a base station 602, MME 603 and a wireless device 601 as per an aspect of an embodiment of the present invention. The base station 602 may transmit at least one control message 604 to the wireless device 601. The at least one control message may configure measurement parameters of the wireless device. The at least one control message 604 may be configured to cause triggering measurements of signal quality of a plurality of carriers.

The first base station 602 may receive at least one measurement report 605 from the wireless device 601. The at least one measurement report 605 may comprise signal quality information of a subset of the plurality of carriers. The base station 602 may transmit a first control message 606 to an MME 603 (or the second base station 610) in the network, if the signal quality information in the at least one measurement report meets a first criterion and the wireless device is in an active call from a first call category with the first base station. The base station 602 may transmit a first control message 606 to an MME 603 (or the second base station 610) in the network, if the signal quality information meets a second criterion and the wireless device is not in an active call from the first call category with the first base station. The base station 602 may receive a second control message 607 from the MME 603 (or from the second base station 610). The second control message 607 may indicate that the second base station accepted the handover request. The base station 602 may transmit a handover command 608 to the wireless device. The handover command may initiate the handover process in the wireless device. The first criterion may be different than the second criterion.

The first call category may be a voice service or a delay sensitive service offered by a service provider. The first base station may be a macro base station, a femto base station, pico base station, or a closed subscriber group base station. The second base station may be a macro base station, a femto base station, pico base station, or a closed subscriber group base station.

The first criterion and the second criterion may consider a relative signal quality value. The relative signal quality value may consider a first signal quality value of a carrier of the first base station and a second signal quality value of a carrier of the second base station. The first criterion may employ comparison of the relative signal quality value with a first threshold value, and the second criterion may employ comparison of the relative signal quality value with a second threshold value. The second signal quality value may consider a measured signal quality value and a bias value. The first criterion may employ a first bias value for computing the second signal quality value. The second criterion may employ a second bias value for computing the second signal quality value. The first bias value may be smaller than the second bias value.

The wireless device may spend a longer period of connection time with the first base station before being handed over to the second base station if the wireless device is in an active call from the first call category with the first base station. The first criterion may consider an absolute signal quality value. The second criterion may consider an absolute signal quality value. The user of the wireless device may be billed differently for calls from the first call category that are carried through the first base station and the second base station. The wireless device may be in an active call from a second call category with the first base station. The first call category and the second call category may be different. Initiating a handover using the first criterion may depend on whether the wireless device is in an active call from a first call category with the first base station. Initiating a handover using the first criterion may not depend on whether the wireless device is or is not in an active call from a second call category with the first base station. The second call category may be a non-delay-sensitive service.

The first base station may receive a proximity indication message from the wireless device before transmitting the at least one control message. The proximity indication message may indicate that the wireless device entered the proximity of the second base station. The proximity indication may be received, if the CSG ID (closed subscriber group identifier) of the second base station is in the CSG white-list of the wireless device. The proximity indication may comprise the carrier frequency of the second base station or the radio access technology of the second base station. The purpose of this procedure may be to indicate that the wireless device is entering or leaving the proximity of one or more cells whose CSG IDs are in the UEs CSG white-list. The detection of proximity may be based on an autonomous search function. The process may be initiated, if the wireless device enters or leaves the proximity of one or more cell(s), whose CSG IDs are in the wireless device CSG white-list, on an LTE or UMTS frequency while proximity indication is enabled for such cells.

The base station may transmit an RRC reconfiguration message to the wireless device configuring proximity indication in the wireless device. The at least one control message may comprise at least one carrier frequency, at least one measurement object, and/or at least one reporting event criterion. The at least one measurement report may comprise at least a physical cell ID of a carrier of the second base station, and/or a signal quality measurement result.

The first base station may transmit an RRC reconfiguration message to the wireless device after receiving the at least one measurement report. The RRC reconfiguration message may request for system information of the second base station. The RRC reconfiguration message may comprise the physical cell ID of the second base station. The base station may receive a measurement report from the wireless device comprising CGI (cell global identifier), TAI (tracking area identifier), CSG ID (cell subscriber group Identifier) or member indication, or any combination of these parameters. The first control message may comprise the second base station CGI and/or CSG ID.

The first control message may comprise Cell Access Mode of the second base station, if the second base station is a hybrid cell. The MME (mobility management entity) performs access control to determine if the handover is accepted or rejected. The handover command comprises mobility control information.

According to some of the various aspects of embodiments, a first base station may handover a wireless device in connected mode from the first base station to a second base station in the plurality of base stations. The first base station and the second base station may have substantially different transmit powers. The base station may initiate a handover using a first criterion, if the wireless device is in an active call from a first call category with the first base station. The base station may initiate a handover using a second criterion, if the wireless device is not in an active call from the first call category with the first base station.

According to some of the various aspects of embodiments, a first base station may handover a wireless device in connected mode from the first base station to a second base station in the plurality of base stations. The first base station may transmit at least one control message to the wireless device. The at least one control message may configure measurement parameters of the wireless device. The measurement configuration may trigger measurements of signal quality of a plurality of carriers. The base station may receive at least one measurement report from the wireless device in response to the at least one control message. The first base station may receive at least one measurement report from the wireless device. The at least one measurement report may comprise signal quality information of a subset of the plurality of carriers. The base station may transmit a first control message to an MME (or the second base station) in the network, if the signal quality of the second base station meets a first criterion, when the wireless device is in an active call from a first call category with the first base station. The base station may transmit a first control message to an MME (or the second base station) in the network, if the signal quality of the second base station meets a second criterion, when the wireless device is not in an active call from the first call category with the first base station. The base station may receive a second control message from the MME. The second control message may indicate that the second base station accepted the handover request. The base station may transmit a handover command to the wireless device. The handover command may initiate the handover process in the wireless device.

According to some of the various aspects of embodiments, a first base station may handover a wireless device in connected mode from the first base station to a second base station in the plurality of base stations. The base station may initiate a handover employing a second criterion, if the wireless device is not in an active call from a first call category with the first base station. The base station may not initiate a handover to the second base station, if the wireless device is in an active call from the first call category with the first base station.

According to some of the various aspects of embodiments, a first base station may handover a wireless device in connected mode from the first base station to a second base station. The first base station may transmit at least one control message to the wireless device, the at least one control message may configure measurement parameters of the wireless device. The measurement configuration may trigger measurements of signal quality of a plurality of carriers. The base station may receive at least one measurement report from the wireless device in response to the at least one control message. The at least one measurement report may comprise signal quality information of a subset of the plurality of carriers. If the wireless device is not in an active call from a first call category with the first base station, and the signal quality of the second base station meets a second criterion, the base station may: a) transmit a first control message to an MME in the network, b) receive a second control message from the MME, the second control message indicating that the second base station accepted the handover request, and/or c) transmit a handover command to the wireless device. The handover command may initiate the handover process in the wireless device. If the wireless device is in an active call from the first call category with the first base station, base station may not initiate a handover to the second base station.

Figure 7:
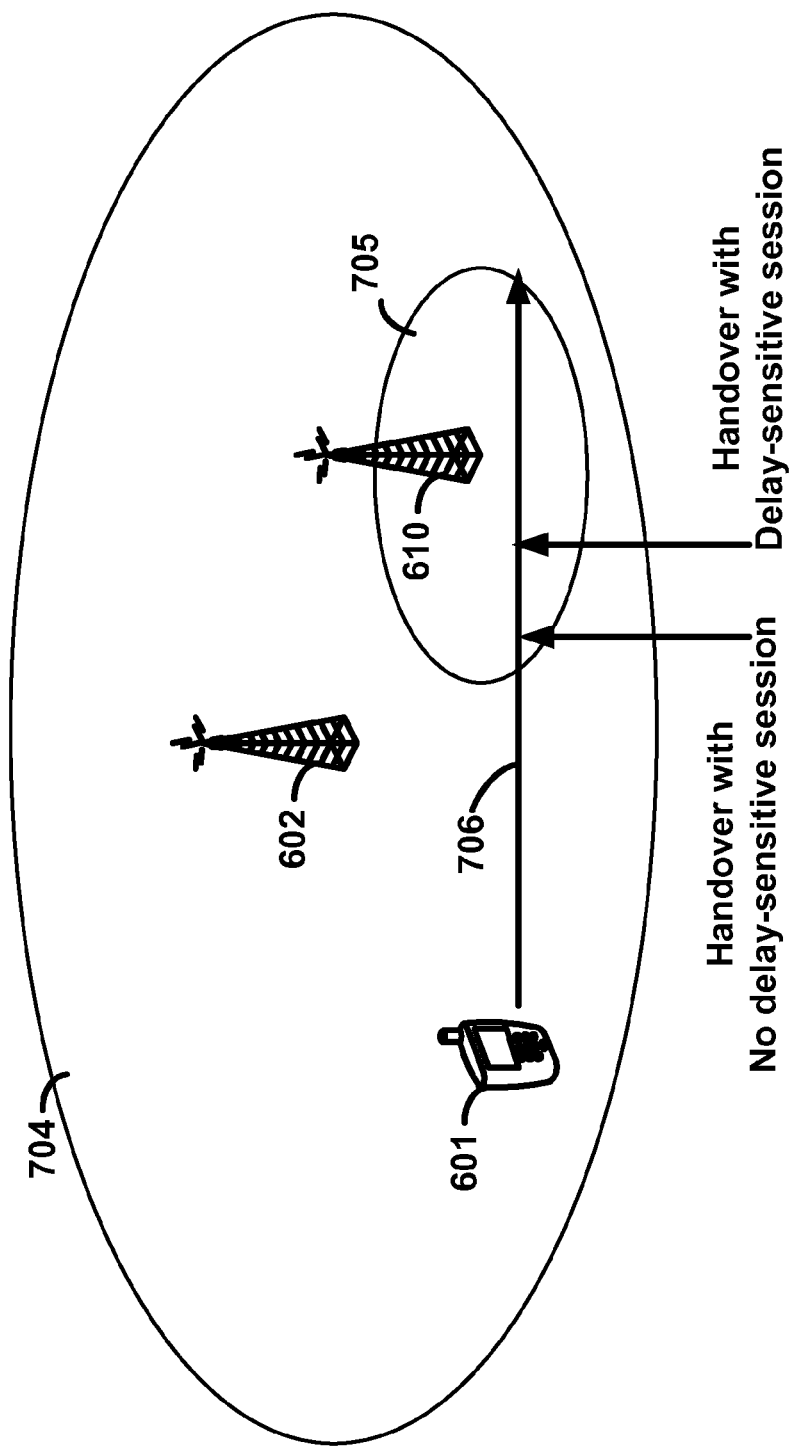
FIG. 7 depicts wireless device handover between a first base station and a second base station as per an aspect of an embodiment of the present invention.

FIG. 7 depicts wireless device 601 handover between a first base station 602 with coverage area 704 and a second base station 610 with coverage area 705 as per an aspect of an embodiment of the present invention. The arrow 706 shows an example trajectory of the wireless device 601. The first criterion and the second criterion employed for handover are substantially different criteria. The handover from a macro-cell to a pico/femto cell may take a substantially longer handover completion period than the handover between two macro-cells or two pico/femto-cells. Calls from the first category may be delay sensitive and a relatively long handover delay may negatively impact the call quality, or may cause interruption in the call, or may cause the call to drop. If the first criterion is employed for handover initiation, the handover decision to a pico/femto cell may be delayed as much as possible, and the first base station may possibly prevent a handover from happening (compared with the case when the wireless device employs the first criterion). In another implementation option, the network may not initiate a handover if the wireless device is an active first category call, because a handover may negatively impact the quality of the call. The network may wait until the first category call is terminated, and then initiate a handover, for example employing the second criterion. The service operators billing practices may be different in macro cells compared with some femto/pico cells. For example, a service operator may bill at a lower rate when a call is connected to a home femto cell that uses a subscriber provided backhaul, rather than service provider backhaul. In such a scenario, it may be advantageous for the service operators to keep the first category call as long as possible on the macro cell, so the subscriber is potentially billed a higher amount. For many reasons not limited to the above reasons, the service operators may choose to employ two different handover criterions depending on what call categories are active in the wireless device. The handover decision may depend on whether a first call category is active or not, and may be independent of presence or lack of presence of a second call category, wherein the first call category and the second call category are different. For example the first call category may be the service operators provided voice call, and the second call category may be a data session.

While the wireless device is in RRC-connected state, the wireless device may perform measurement and mobility procedures based on the configuration provided by the network. The wireless device may not support manual selection of CSG IDs while in RRC-connected state. Handover to a base station follows the framework of wireless-device-assisted and network-controlled handover. Handover to a femto or pico base station may be different from the normal handover procedure in different aspects.

In case the wireless device is able to determine, using autonomous search procedures, that it is near a CSG or hybrid cell whose CSG ID is in the wireless device's CSG white-list, the wireless device may provide to the source base station an indication of proximity. The proximity indication may be employed as follows: a) if a measurement configuration is not present for the concerned frequency/RAT (radio access technology), the source base station may configure the wireless device to perform measurements and reporting for the concerned frequency/RAT; b) the source base station may determine whether to perform other actions related to handover to base stations based on having received a proximity indication (for example, the source base station may not configure the wireless device to acquire system information of the base station unless it has received a proximity indication).

Due to the typical cell size of a pico/femto base stations being much smaller than macro cells, there can be multiple pico/femto base stations within the coverage of the source base station that have the same PSC/PCI (physical scrambling code/physical cell identifier). This leads to a condition referred to as PSC/PCI confusion, wherein the source base station is unable to determine the correct target cell for handover from the PSC/PCI included in the measurement reports from the wireless device. PSC/PCI confusion may be solved by the wireless device reporting the global cell identity of the target pico/femto base station. If the target cell is a hybrid cell, prioritization of allocated resources may be performed based on the wireless device's membership status. Access control may be done by a two step process, where first the wireless device reports the membership status based on the CSG ID received from the target cell and the wireless device's CSG white-list, and then the network verifies the reported status. A hybrid cell is a CSG cell that also accepts connections from non-member wireless devices. Hybrid Cells may have a CSG Indication bit set to FALSE but broadcast a CSG Identity. The PCI values for hybrid cells may not be contained within the reserved PCI range for CSG cells. Similar to CSG cells, the network may reserve a PCI list for hybrid cells.

According to some of the various aspects of embodiments, in an LTE or LTE-advanced network, mobility from base station to a base station's CSG/hybrid cell may take place with the S1 handover procedure or X2 handover procedure. In the following call flow the source cell can be a pico/femto base station or a base station. The procedure may apply to any scenario where the CSG ID is provided by the wireless device or provided by the source base station. Some of the following tasks in the call flow may be not executed, and some of the steps may be eliminated without affecting the handover performance depending on the deployment scenario. 1) The source base station may configure the wireless device with proximity indication control. 2) The wireless device may send an "entering" proximity indication when it determines it may be near a cell (based on autonomous search procedures) whose CSG ID is in the wireless device's CSG white-list. The proximity indication may include the RAT and frequency of the cell. 3) If a measurement configuration is not present for the concerned frequency/RAT, the source base station may configure the wireless device with relevant measurement configuration including measurement gaps as needed, so that the wireless device may perform measurements on the reported RAT and frequency. The network may also use the proximity indication to minimize the requesting of handover preparation information of CSG/hybrid cells by avoiding requesting such information when the wireless device is not in the geographical area where cells whose CSG IDs are in the wireless devices CSG White-list are located. 4) The wireless device may send a measurement report including the PCI (physical cell Identifier). 5) The source base station may configure the wireless device to perform SI (system information) acquisition and reporting of a particular PCI. 6) The wireless device may perform SI acquisition using autonomous gaps, for example, the wireless device may suspend reception and transmission with the source base station within the limits defined in to acquire the relevant system information from the target base station. 7) The wireless device may send a measurement report including CGI (cell global ID), TAI (tracking area identifier), CSG ID (cell subscriber group identifier) and member/non-member indication. 8) The source base station may include the target CGI and the CSG ID in the Handover Required message sent to the MME. If the target is a hybrid cell, the Cell Access Mode of the target may be included. 9) The MME may perform wireless device access control to the CSG cell based on the CSG ID received in the Handover Required message and the stored CSG subscription data for the wireless device. If the access control procedure fails, the MME may end the handover procedure by replying with the Handover Preparation Failure message. If the Cell Access Mode is present, the MME may determine the CSG Membership Status of the wireless device handing over to the hybrid cell and includes it in the Handover Request message. 10) The MME (mobility management entity) may send the Handover Request message to the target base station including the target CSG ID received in the Handover Required message. If the target is a hybrid cell the CSG Membership Status may be included in the Handover Request message. 11) The target base station may verify that the CSG ID received in the Handover Request message matches the CSG ID broadcast in the target cell and if such validation is successful it may allocate appropriate resources. Wireless device prioritization may also be applied if the CSG Membership Status indicates that the wireless device is a member. 12) The target base station may send the Handover Request Acknowledge message to the MME via the base station GW if present. 13) The MME sends the Handover Command message to the source base station. 14) The source base station may transmit the Handover Command (RRC Connection Reconfiguration message including mobility control information) to the wireless device.

After sending an "entering" proximity indication (step 2), if the wireless device determines that it is no longer near a cell whose CSG ID is in the wireless device's CSG white-list, the wireless device may send a "leaving" proximity indication to the source base station. Upon reception of this indication, the source base station may reconfigure the wireless device to stop measurements on the reported RAT and frequency. In the above procedure, steps 2 and 3 may not be performed in case the wireless device has not previously visited the base station, e.g., when the wireless device first visits a hybrid cell. The PCI (physical cell identifier) confusion may be resolved by steps 5, 6 and 7. The source base station may request SI acquisition and reporting for any PCI, not limited to PCIs of CSG or hybrid cells.

In an example embodiment of the invention the wireless device may implement the following measurement model. Assume that point A is the measurements (samples) depending on an internal physical layer implementations. Internal layer 1 filtering may be performed on the inputs measured at point A. Exact filtering is implementation dependent. How the measurements are actually executed in the physical layer by an implementation (inputs A and Layer 1 filtering) may not be constrained by the standard. A measurement reported by layer 1 enters to layer 3 filtering at point B after layer 1 filtering. Layer 3 filtering may be performed on the measurements provided at point B. The behavior of the Layer 3 filters may be standardized and the configuration of the layer 3 filters may be provided by RRC signaling. Filtering reporting period at Layer 3 filtering (at point C) equals one measurement period at B. A measurement report may be available after processing in the layer 3 filter. The reporting rate is identical to the reporting rate at point B. This measurement may be used as input for one or more evaluation of reporting criteria. Evaluation of reporting criteria may check whether actual measurement reporting is necessary. The evaluation may employ more than one flow of measurements at reference point C e.g. to compare between different measurements. The wireless device may evaluate the reporting criteria at least every time a new measurement result is reported. The reporting criteria may be standardized and the configuration may be provided by RRC signaling (wireless device measurements). Then measurement report information (message) may be sent on the radio interface. Layer 1 filtering may introduce a certain level of measurement averaging. How and when the wireless device performs the required measurements may be implementation specific to the point that the output at B fulfills the performance requirements. Layer 3 filtering and parameters may not introduce any delay in the sample availability between B and C.

The wireless device reports measurement information in accordance with the measurement configuration as provided by network. Network may provide the measurement configuration applicable for a wireless device in RRC-connected by means of dedicated signaling, for example, using the RRC Connection Reconfiguration message. The wireless device may be requested to perform the following types of measurements: a) Intra-frequency measurements: measurements at the downlink carrier frequency(ies) of the serving cell(s), b) Inter-frequency measurements: measurements at frequencies that differ from any of the downlink carrier frequency(ies) of the serving cell(s), c) Inter-RAT measurements of UTRA frequencies, d) Inter-RAT measurements.

The measurement configuration may include the following parameters:

Measurement objects: The objects on which the wireless device may perform the measurements. For intra-frequency and inter-frequency measurements a measurement object may be a single network carrier frequency. Associated with this carrier frequency, network may configure a list of cell specific offsets and a list of blacklisted cells. Blacklisted cells may not be considered in event evaluation or measurement reporting. For inter-RAT UMTS measurements a measurement object may be a set of cells on a single UMTS carrier frequency. Some measurements using the above mentioned measurement objects, may concern a single cell, e.g. measurements used to report neighboring cell system information, PCell wireless device Rx-Tx time difference.

Reporting configurations: A list of reporting configurations where each reporting configuration may include the following: a) The reporting criterion that triggers the wireless device to send a measurement report. This may either be periodical or a single event description. B) The quantities that the wireless device includes in the measurement report and associated information (e.g. number of cells to report).

Measurement identities: A list of measurement identities where each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

Quantity configurations: One quantity configuration may be configured per RAT type. The quantity configuration may define the measurement quantities and associated filtering used for all event evaluation and related reporting of that measurement type. One filter may be configured per measurement quantity.

Measurement gaps: Periods that the wireless device may use to perform measurements, for example, no (UL, DL) transmissions are scheduled.

Network may configure a single measurement object for a given frequency. Network may configure multiple instances of the same event e.g. by configuring two reporting configurations with different thresholds. The wireless device may maintain a single measurement object list, a reporting configuration list, and a measurement identities list. The measurement object list may include measurement objects, that are specified per RAT type, possibly including intra-frequency object(s) (for example, the object(s) corresponding to the serving frequency(ies)), inter-frequency object(s) and inter-RAT objects. Similarly, the reporting configuration list may include network and inter-RAT reporting configurations. Any measurement object may be linked to any reporting configuration of the same RAT type. Some reporting configurations may not be linked to a measurement object. Likewise, some measurement objects may not be linked to a reporting configuration.

The measurement procedures may distinguish the following types of cells: a) The serving cell(s): these are the PCell and one or more SCells, if configured for a wireless device supporting CA (carrier aggregation), b) Listed cells: these are cells listed within the measurement object(s), or c) Detected cells: these are cells that are not listed within the measurement object(s) but are detected by the wireless device on the carrier frequency(ies) indicated by the measurement object(s). For network, the wireless device measures and reports on the serving cell(s), listed cells and detected cells. This specification is based on the assumption that typically CSG cells of home deployment type may not be indicated within the neighbor list. Furthermore, the assumption is that for non-home deployments, the physical cell identity is unique within the area of a large macro cell (for example, as for UTRAN).

Measurement reports may be triggered when one of the following conditions are met:

Event A1 (serving becomes better than threshold): for this measurement, the primary or secondary cell that is configured on the frequency indicated in the associated measurement object may be considered to be the serving cell.

Event A2 (serving becomes worse than threshold): for this measurement, the primary or secondary cell that is configured on the frequency indicated in the associated measurement object may be considered to be the serving cell.

Event A3 (neighbor becomes offset better than PCell): The cell(s) that triggers the event may be on the frequency indicated in the associated measurement object which may be different from the (primary) frequency used by the PCell.

Event A4 (neighbor becomes better than threshold).

Event A5 (PCell becomes worse than threshold1 and neighbor becomes better than threshold2): The cell(s) that triggers the event is on the frequency indicated in the associated measurement object which may be different from the (primary) frequency used by the PCell.

Event A6 (neighbor becomes offset better than SCell): for this measurement, the (secondary) cell that is configured on the frequency indicated in the associated measurement object may be considered to be the serving cell. The neighbor(s) may be on the same frequency as the SCell, for example, both may be on the frequency indicated in the associated measurement object.

Event B1 (Inter RAT neighbor becomes better than threshold): for UMTS and CDMA2000, trigger the event for cells may be included in the corresponding measurement object.

Event B2 (PCell becomes worse than threshold) and inter RAT neighbour becomes better than threshold2). For UTRA and CDMA2000, the event may be triggered for cells included in the corresponding measurement object.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

The precoder may receive a block of vectors from the layer mapping and generate a block of vectors to be mapped onto resources on the antenna port(s). Precoding for spatial multiplexing using antenna port(s) with cell-specific reference signals may be used in combination with layer mapping for spatial multiplexing. Spatial multiplexing may support two or four antenna ports and the set of antenna ports used may be {0,1} or {0, 1, 2, 3}. Precoding for transmit diversity may be used in combination with layer mapping for transmit diversity. The precoding operation for transmit diversity may be defined for two and four antenna ports. Precoding for spatial multiplexing using antenna ports with UE-specific reference signals may also, for example, be used in combination with layer mapping for spatial multiplexing. Spatial multiplexing using antenna ports with UE-specific reference signals may support up to eight antenna ports. Reference signals may be pre-defined signals that may be used by the receiver for decoding the received physical signal, estimating the channel state, and/or other purposes.

For antenna port(s) used for transmission of the physical channel, the block of complex-valued symbols may be mapped in sequence to resource elements. In resource blocks in which UE-specific reference signals are not transmitted the PDSCH may be transmitted on the same set of antenna ports as the physical broadcast channel in the downlink (PBCH). In resource blocks in which UE-specific reference signals are transmitted, the PDSCH may be transmitted, for example, on antenna port(s) $\{5, \{7\}, \{8\}, \text{or } \{7, 8, \ldots, v+6\}$, where v is the number of layers used for transmission of the PDSCH.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M×N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of pre-coded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula (s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation. f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various aspects of embodiments, the sequence used for a primary synchronization signal may be generated from a frequency-domain Zadoff-Chu sequence according to a pre-defined formula. A Zadoff-Chu root sequence index may also be predefined in a specification. The mapping of the sequence to resource elements may depend on a frame structure. The wireless device may not assume that the primary synchronization signal is transmitted on the same antenna port as any of the downlink reference signals. The wireless device may not assume that any transmission instance of the primary synchronization signal is transmitted on the same antenna port, or ports, used for any other transmission instance of the primary synchronization signal. The sequence may be mapped to the resource elements according to a predefined formula.

For FDD frame structure, a primary synchronization signal may be mapped to the last OFDM symbol in slots 0 and 10. For TDD frame structure, the primary synchronization signal may be mapped to the third OFDM symbol in subframes 1 and 6. Some of the resource elements allocated to primary or secondary synchronization signals may be reserved and not used for transmission of the primary synchronization signal.

According to some of the various aspects of embodiments, the sequence used for a secondary synchronization signal may be an interleaved concatenation of two length-31 binary sequences. The concatenated sequence may be scrambled with a scrambling sequence given by a primary synchronization signal. The combination of two length-31 sequences defining the secondary synchronization signal may differ between subframe 0 and subframe 5 according to predefined formula (s). The mapping of the sequence to resource elements may depend on the frame structure. In a subframe for FDD frame structure and in a half-frame for TDD frame structure, the same antenna port as for the primary synchronization signal may be used for the secondary synchronization signal. The sequence may be mapped to resource elements according to a predefined formula.

Example embodiments for the physical channels configuration will now be presented. Other examples may also be possible. A physical broadcast channel may be scrambled with a cell-specific sequence prior to modulation, resulting in a block of scrambled bits. PBCH may be modulated using QPSK, and/or the like. The block of complex-valued symbols for antenna port(s) may be transmitted during consecutive radio frames, for example, four consecutive radio frames. In some embodiments the PBCH data may arrive to the coding unit in the form of a one transport block every transmission time interval (TTI) of 40 ms. The following coding actions may be identified. Add CRC to the transport block, channel coding, and rate matching. Error detection may be provided on PBCH transport blocks through a Cyclic Redundancy Check (CRC). The transport block may be used to calculate the CRC parity bits. The parity bits may be computed and attached to the BCH (broadcast channel) transport block. After the attachment, the CRC bits may be scrambled according to the transmitter transmit antenna configuration. Information bits may be delivered to the channel coding block and they may be tail biting convolutionally encoded. A tail biting convolutionally coded block may be delivered to the rate matching block. The coded block may be rate matched before transmission.

A master information block may be transmitted in PBCH and may include system information transmitted on broadcast channel(s). The master information block may include downlink bandwidth, system frame number(s), and PHICH (physical hybrid-ARQ indicator channel) configuration. Downlink bandwidth may be the transmission bandwidth configuration, in terms of resource blocks in a downlink, for example 6 may correspond to 6 resource blocks, 15 may correspond to 15 resource blocks and so on. System frame number(s) may define the N (for example N=8) most significant bits of the system frame number. The M (for example M=2) least significant bits of the SFN may be acquired implicitly in the PBCH decoding. For example, timing of a 40 ms PBCH TTI may indicate 2 least significant bits (within 40 ms PBCH TTI, the first radio frame: 00, the second radio frame: 01, the third radio frame: 10, the last radio frame: 11). One value may apply for other carriers in the same sector of a base station (the associated functionality is common (e.g. not performed independently for each cell). PHICH configuration(s) may include PHICH duration, which may be normal (e.g. one symbol duration) or extended (e.g. 3 symbol duration).

Physical control format indicator channel(s) (PCFICH) may carry information about the number of OFDM symbols used for transmission of PDCCHs (physical downlink control channel) in a subframe. The set of OFDM symbols possible to use for PDCCH in a subframe may depend on many parameters including, for example, downlink carrier bandwidth, in terms of downlink resource blocks. PCFICH transmitted in one subframe may be scrambled with cell-specific sequence(s) prior to modulation, resulting in a block of scrambled bits. A scrambling sequence generator(s) may be initialized at the start of subframe(s). Block (s) of scrambled bits may be modulated using QPSK. Block(s) of modulation symbols may be mapped to at least one layer and precoded resulting in a block of vectors representing the signal for at least one antenna port. Instances of PCFICH control channel(s) may indicate one of several (e.g. 3) possible values after being decoded. The range of possible values of instance(s) of the first control channel may depend on the first carrier bandwidth.

According to some of the various embodiments, physical downlink control channel(s) may carry scheduling assignments and other control information. The number of resource-elements not assigned to PCFICH or PHICH may be assigned to PDCCH. PDCCH may support multiple formats. Multiple PDCCH packets may be transmitted in a subframe. PDCCH may be coded by tail biting convolutionally encoder before transmission. PDCCH bits may be scrambled with a cell-specific sequence prior to modulation, resulting in block(s) of scrambled bits. Scrambling sequence generator(s) may be initialized at the start of subframe(s). Block(s) of scrambled bits may be modulated using QPSK. Block(s) of modulation symbols may be mapped to at least one layer and precoded resulting in a block of vectors representing the signal for at least one antenna port. PDCCH may be transmitted on the same set of antenna ports as the PBCH, wherein PBCH is a physical broadcast channel broadcasting at least one basic system information field.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. OFDM subcarriers that are allocated for transmission of PDCCH may occupy the bandwidth of downlink carrier(s). PDCCH channel(s) may carry a plurality of downlink control packets in subframe(s). PDCCH may be transmitted on downlink carrier(s) starting from the first OFDM symbol of subframe(s), and may occupy up to multiple symbol duration(s) (e.g. 3 or 4).

According to some of the various embodiments, PHICH may carry the hybrid-ARQ (automatic repeat request) ACK/NACK. Multiple PHICHs mapped to the same set of resource elements may constitute a PHICH group, where PHICHs within the same PHICH group may be separated through different orthogonal sequences. PHICH resource(s) may be identified by the index pair (group, sequence), where group(s) may be the PHICH group number(s) and sequence(s) may be the orthogonal sequence index within the group(s). For frame structure type 1, the number of PHICH groups may depend on parameters from higher layers (RRC). For frame structure type 2, the number of PHICH groups may vary between downlink subframes according to a pre-defined arrangement. Block(s) of bits transmitted on one PHICH in one subframe may be modulated using BPSK or QPSK, resulting in a block(s) of complex-valued modulation symbols. Block(s) of modulation symbols may be symbol-wise multiplied with an orthogonal sequence and scrambled, resulting in a sequence of modulation symbols Other arrangements for PCFICH, PHICH, PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); 0 initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a first downlink carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may include a configurable timer (timeAlignmentTimer) that may be used to control how long the wireless device is considered uplink time aligned. When a timing alignment command MAC control element is received, the wireless device may apply the timing alignment command and start or restart timeAlignmentTimer. The wireless device may not perform any uplink transmission except the random access preamble transmission when timeAlignmentTimer is not running or when it exceeds its limit. The time alignment command may substantially align frame and subframe reception timing of a first uplink carrier and at least one additional uplink carrier. According to some of the various aspects of embodiments, the time alignment command value range employed during a random access process may be substantially larger than the time alignment command value range during active data transmission. In an example embodiment, uplink transmission timing may be maintained on a per time alignment group (TAG) basis. Carrier(s) may be grouped in TAGs, and TAG(s) may have their own downlink timing reference, time alignment timer, and/or time alignment commands. Group(s) may have their own random access process. Time alignment commands may be directed to a time alignment group. The TAG, including the primary cell may be called a primary TAG (pTAG) and the TAG not including the primary cell may be called a secondary TAG (sTAG).

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

According to some of the various aspects of embodiments, data packet(s) may be encrypted before transmission to secure packet(s) from unwanted receiver(s). Desired recipient(s) may be able to decrypt the packet(s). A first plurality of data packet(s) and/or a second plurality of data packet(s) may be encrypted using an encryption key and at least one parameter that may change substantially rapidly over time. The encryption mechanism may provide a transmission that may not be easily eavesdropped by unwanted receivers. The encryption mechanism may include additional parameter(s) in an encryption module that changes substantially rapidly in time to enhance the security mechanism. Example varying parameter(s) may comprise various types of system counter(s), such as system frame number. Substantially rapidly may for example imply changing on a per subframe, frame, or group of subframes basis. Encryption may be provided by a PDCP layer between the transmitter and receiver, and/or may be provided by the application layer. Additional overhead added to packet(s) by lower layers such as RLC, MAC, and/or Physical layer may not be encrypted before transmission. In the receiver, the plurality of encrypted data packet(s) may be decrypted using a first decryption key and at least one first parameter. The plurality of data packet(s) may be decrypted using an additional parameter that changes substantially rapidly over time.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI (precoding matrix indicator)/RI (ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer.

According to some of the various aspects of embodiments, subcarriers and/or resource blocks may comprise a plurality of physical subcarriers and/or resource blocks. In another example embodiment, subcarriers may be a plurality of virtual and/or logical subcarriers and/or resource blocks.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, subcarriers may include data subcarrier symbols and pilot subcarrier symbols. Pilot symbols may not carry user data, and may be included in the transmission to help the receiver to perform synchronization, channel estimation and/or signal quality detection. Base stations and wireless devices (wireless receiver) may use different methods to generate and transmit pilot symbols along with information symbols.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like. According to some of the various aspects of embodiments of the present invention, layer 1 (physical layer) may be based on OFDMA or SC-FDMA. Time may be divided into frame(s) with fixed duration. Frame(s) may be divided into substantially equally sized subframes, and subframe(s) may be divided into substantially equally sized slot(s). A plurality of OFDM or SC-FDMA symbol(s) may be transmitted in slot(s). OFDMA or SC-FDMA symbol(s) may be grouped into resource block(s). A scheduler may assign resource(s) in resource block unit(s), and/or a group of resource block unit(s). Physical resource block(s) may be resources in the physical layer, and logical resource block(s) may be resource block(s) used by the MAC layer. Similar to virtual and physical subcarriers, resource block(s) may be mapped from logical to physical resource block(s). Logical resource block(s) may be contiguous, but corresponding physical resource block(s) may be non-contiguous. Some of the various embodiments of the present invention may be implemented at the physical or logical resource block level(s).

According to some of the various aspects of embodiments, layer 2 transmission may include PDCP (packet data convergence protocol), RLC (radio link control), MAC (media access control) sub-layers, and/or the like. MAC may be responsible for the multiplexing and mapping of logical channels to transport channels and vice versa. A MAC layer may perform channel mapping, scheduling, random access channel procedures, uplink timing maintenance, and/or the like.

According to some of the various aspects of embodiments, the MAC layer may map logical channel(s) carrying RLC PDUs (packet data unit) to transport channel(s). For transmission, multiple SDUs (service data unit) from logical channel(s) may be mapped to the Transport Block (TB) to be sent over transport channel(s). For reception, TBs from transport channel(s) may be demultiplexed and assigned to corresponding logical channel(s). The MAC layer may perform scheduling related function(s) in both the uplink and downlink and thus may be responsible for transport format selection associated with transport channel(s). This may include HARQ functionality. Since scheduling may be done at the base station, the MAC layer may be responsible for reporting scheduling related information such as UE (user equipment or wireless device) buffer occupancy and power headroom. It may also handle prioritization from both an inter-UE and intra-UE logical channel perspective. MAC may also be responsible for random access procedure(s) for the uplink that may be performed following either a contention and non-contention based process. UE may need to maintain timing synchronization with cell(s). The MAC layer may perform procedure(s) for periodic synchronization.

According to some of the various aspects of embodiments, the MAC layer may be responsible for the mapping of multiple logical channel(s) to transport channel(s) during transmission(s), and demultiplexing and mapping of transport channel data to logical channel(s) during reception. A MAC PDU may include of a header that describes the format of the PDU itself, which may include control element(s), SDUs, Padding, and/or the like. The header may be composed of multiple sub-headers, one for constituent part(s) of the MAC PDU. The MAC may also operate in a transparent mode, where no header may be pre-pended to the PDU. Activation command(s) may be inserted into packet(s) using a MAC control element.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

According to some of the various aspects of embodiments, an RLC sub-layer may control the applicability and functionality of error correction, concatenation, segmentation, re-segmentation, duplicate detection, in-sequence delivery, and/or the like. Other functions of RLC may include protocol error detection and recovery, and/or SDU discard. The RLC sub-layer may receive data from upper layer radio bearer(s) (signaling and data) called service data unit(s) (SDU). The transmission entities in the RLC layer may convert RLC SDUs to RLC PDU after performing functions such as segmentation, concatenation, adding RLC header(s), and/or the like. In the other direction, receiving entities may receive RLC PDUs from the MAC layer. After performing reordering, the PDUs may be assembled back into RLC SDUs and delivered to the upper layer. RLC interaction with a MAC layer may include: a) data transfer for uplink and downlink through logical channel(s); b) MAC notifies RLC when a transmission opportunity becomes available, including the size of total number of RLC PDUs that may be transmitted in the current transmission opportunity, and/or c) the MAC entity at the transmitter may inform RLC at the transmitter of HARQ transmission failure.

According to some of the various aspects of embodiments, PDCP (packet data convergence protocol) may comprise a layer 2 sub-layer on top of RLC sub-layer. The PDCP may be responsible for a multitude of functions. First, the PDCP layer may transfer user plane and control plane data to and from upper layer(s). PDCP layer may receive SDUs from upper layer(s) and may send PDUs to the lower layer(s). In other direction, PDCP layer may receive PDUs from the lower layer(s) and may send SDUs to upper layer(s). Second, the PDCP may be responsible for security functions. It may apply ciphering (encryption) for user and control plane bearers, if configured. It may also perform integrity protection for control plane bearer(s), if configured. Third, the PDCP may perform header compression service(s) to improve the efficiency of over the air transmission. The header compression may be based on robust header compression (ROHC). ROHC may be performed on VOIP packets. Fourth, the PDCP may be responsible for in-order delivery of packet(s) and duplicate detection service(s) to upper layer(s) after handover(s). After handover, the source base station may transfer unacknowledged packet(s)s to target base station when operating in RLC acknowledged mode (AM). The target base station may forward packet(s)s received from the source base station to the UE (user equipment).

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for use by a first base station of a radio technology, the method comprising:
   a) transmitting at least one control message to a wireless device, said wireless device having one connection with said first base station, said connection configurable to carry a plurality of calls over said connection via said radio technology, each call being from a call category in a plurality of call categories, said at least one control message configured to cause:
      i) configuration of measurement parameters on said wireless device; and
      ii) triggering measurements of signal quality of a plurality of carriers;
   b) receiving from said wireless device at least one measurement report comprising signal quality information of a subset of said plurality of carriers;
   c) transmitting a first control message to a network node in a wireless network to initiate a handover of said connection to a second base station of said radio technology based on criteria on said signal quality information, said criteria being employed for handover at least when said connection comprises a plurality of calls of different call types, said criteria comprising a first criterion and a second criterion different from said first criterion, said first criterion being employed if said connection engages in an active call from said first call category, said second criterion being employed if said connection does not engage in an active call from said first call category, wherein the first call category is a voice call, wherein said first base station is of a different type compared with said second base station,
   d) receiving a second control message from said network node, said second control message indicating that said second base station accepted the handover request; and
   e) transmitting a handover command to said wireless device, said handover command initiating a handover process in said wireless device.

2. The method of claim 1, wherein said network node is one of the following:
   a) a Mobility Management entity; and
   b) said second base station.

3. The method of claim 1, wherein:
   a) said first base station is a macro base station; and
   b) said second base station is a femto base station.

4. The method of claim 1, further comprising receiving a proximity indication message from said wireless device before transmitting said at least one control message, said proximity indication message indicating that said wireless device entered the proximity of said second base station.

5. The method of claim 4, wherein said proximity indication is received, if the CSG ID of said second base station is in the CSG white-list of said wireless device.

6. The method of claim 1, further comprising transmitting an RRC reconfiguration message to said wireless device configured to cause the configuration of a proximity indication in said wireless device.

7. The method of claim 1, further comprising said base station transmitting an RRC reconfiguration message to said wireless device after receiving said at least one measurement report, said RRC reconfiguration message configured to request system information of said second base station.

8. The method of claim 7, wherein said RRC reconfiguration message comprises the physical cell ID of said second base station.

9. The method of claim 8, further comprising said base station receiving a measurement report from said wireless device comprising CGI, TAI, CSG ID and member indication.

10. A method for use by a first base station of a radio technology, the method comprising:
   a) receiving from a wireless device at least one measurement report comprising signal quality information of a subset of a plurality of carriers, said wireless device having one connection with said first base station, said connection configurable to carry a plurality of calls over said connection via said radio technology, each call being from a call category in a plurality of call categories; and
   b) initiating a handover of said connection to a second base station of said radio technology based on criteria on said signal quality information, said criteria being employed for handover at least when said connection comprises a plurality of calls of different call types, said criteria comprising a first criterion and a second criterion different from said first criterion, said first criterion being employed if said connection engages in an active call from said first call category, said second criterion being employed if said connection does not engage in an active call from said first call category, wherein the first call category is a voice call, wherein said first base station is of a different type compared with said second base station.

11. The method of claim 10, wherein said call is carried over a radio bearer.

12. The method of claim 10, wherein said at least one measurement report comprises:
   a) at least one channel state information report; and
   b) at least one RRC measurement report.

13. The method of claim 10, wherein each of said first criterion and said second criterion considers a relative signal quality value.

14. The method of claim 10, wherein said relative signal quality value considers a first signal quality value of a first carrier of said first base station and a second signal quality value of a second carrier of said second base station.

15. The method of claim 14, wherein said first criterion is based on comparison of said relative signal quality value with a first threshold value, and said second criterion is based on comparison of said relative signal quality value with a second threshold value.

16. The method of claim 14, wherein said second signal quality value considers a measured signal quality value and a bias value.

17. The method of claim 10, wherein the user of said wireless device is billed differently by a service provider for:
   a) calls from said first call category that are carried through said first base station; and
   b) calls from said first call category that are carried through said second base station.

18. A first base station of a radio technology comprising:
   a) one or more communication interfaces;
   b) one or more processors; and
   c) memory storing instructions that, when executed, cause said first base station to:
      i) receive from a wireless device at least one measurement report comprising signal quality information of a subset of a plurality of carriers, said wireless device having one connection with said first base station, said connection configurable to carry a plurality of calls over said connection via said radio technology, each call being from a call category in a plurality of call categories; and
      ii) initiate a handover of said connection to a second base station of said radio technology based on criteria on said signal quality information, said criteria being employed for handover at least when said connection comprises a plurality of calls of different call types, said criteria comprising a first criterion and a second criterion different from said first criterion, said first criterion being employed if said connection engages in an active call from said first call category, said second criterion being employed if said connection does not engage in an active call from said first call category, wherein the first call category is a voice call, wherein said first base station is of a different type compared with said second base station.

19. The first base station of claim 18, wherein:
   a) said first base station is a macro base station; and
   b) said second base station is a femto base station.

* * * * *